United States Patent

Bateman

[11] Patent Number: 5,909,818
[45] Date of Patent: Jun. 8, 1999

[54] WATER TANK ADAPTER

[76] Inventor: Roy E. Bateman, R.D. 1 Box 431, Cogan Station, Pa. 17728

[21] Appl. No.: 08/971,174

[22] Filed: Nov. 14, 1997

[51] Int. Cl.$^6$ .................................................. B65D 45/00
[52] U.S. Cl. .......................................... 220/601; 220/86.1
[58] Field of Search .................................... 220/601, 661, 220/565, 567.1, 304, 729, 86.1

[56] References Cited

U.S. PATENT DOCUMENTS

| | | | |
|---|---|---|---|
| 1,237,426 | 8/1917 | Wales | 220/86.1 X |
| 1,540,554 | 6/1925 | Griffiths | 220/601 X |
| 2,356,327 | 8/1944 | Lebus | 220/86.1 X |
| 3,628,577 | 12/1971 | Kruis | 220/86.1 X |
| 4,685,585 | 8/1987 | Robbins | 220/601 X |
| 5,413,240 | 5/1995 | Hunter et al. | 220/601 X |
| 5,481,790 | 1/1996 | Koreis et al. | 220/565 X |

*Primary Examiner*—Steven Pollard
*Attorney, Agent, or Firm*—John J. Elnitski, Jr.

[57] ABSTRACT

The present invention provides an apparatus and method for modifying existing water tanks on recreational vehicles so they may be cleaned. The apparatus and method may also be applied during the production of new water tanks for recreational vehicles. The apparatus includes an inlet plate, side wall with threads, gaskets, seal plate and a threaded plug. The method is the installation of the apparatus.

8 Claims, 3 Drawing Sheets

WATER TANK ADAPTER

BACKGROUND

The present invention relates to water tanks, especially water tanks in recreational vehicles which require cleaning and service.

The industry of recreational vehicles typically provides a vehicle which includes one or more fresh water tanks. The fresh water tanks are used to provide fresh water to the occupants of the vehicle. The majority of existing fresh water tanks provided on recreational vehicles are one piece and have only an inlet and outlet. The inlet and outlet are normally of a diameter of a garden hose. This presents a problem when the user of the tank wishes to clean the tank or store the vehicle along with the tank for a period of non-use. The period of non-use is usually when the recreational vehicle is stored during winter months. Cleaning requires the use of chemicals due to inability of the user to get inside the tank to clean it. Usually, the water tanks are not easy to detach and re-attach for cleaning purposes. Therefore, the recreational vehicle manufactures actually recommend filling the tank with cleaning chemicals and driving the vehicle forwards and backwards to provide a cleaning action that is unattainable in any other way. Storage of the tank with the vehicle requires filling the tank with clean water after the tank has been clean. Storage of the tank filled with water usually requires the addition of anti-freeze so that the water does not freeze during the winter months. After the tank is stored, cleaning is recommended before use.

It is an objective of the present invention to provide an apparatus and method to modify existing recreational vehicle water tanks so they may be easily cleaned by the user. It is also an objective of the present invention to incorporate this feature in new tanks before attachment to recreational vehicles.

SUMMARY OF THE INVENTION

The present invention is a water tank adapter to allow cleaning and service of a recreational vehicle water tank. The adapter includes an inlet plate having an opening; an outer gasket to act as a seal between the inlet plate and the water tank; and a plug for closing the opening. The adapter further includes a side wall which extends from the inlet plate into the water tank and has threads to interact with threads found on the plug. The adapter has a ridge which extends from the side wall inward toward the opening and an inner gasket which lies along the ridge to form a seal between the ridge and the plug. An optional seal plate which is seated between the inner gasket and the plug provides added protection from leakage along the threads. The adapter is typically bolted to the water tank.

DETAILED DESCRIPTION

The present invention provides an apparatus and method for modifying existing water tanks on recreational vehicles so they may be cleaned. The apparatus and method described herein may also be applied during the production of new water tanks for recreational vehicles.

Figure 1:
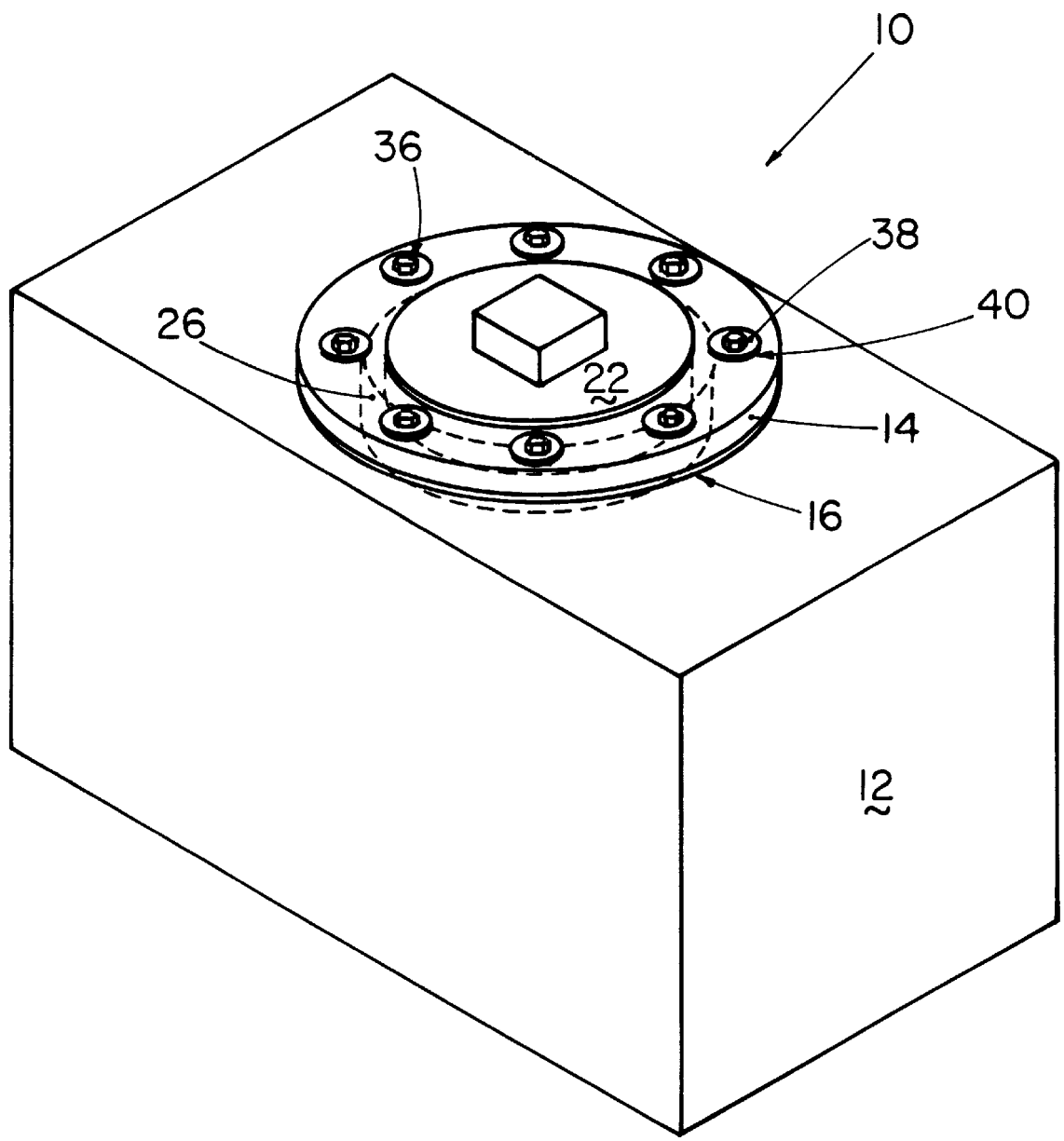
FIG. 1 is a perspective view of the present invention in the mounted position.
Figure 2:
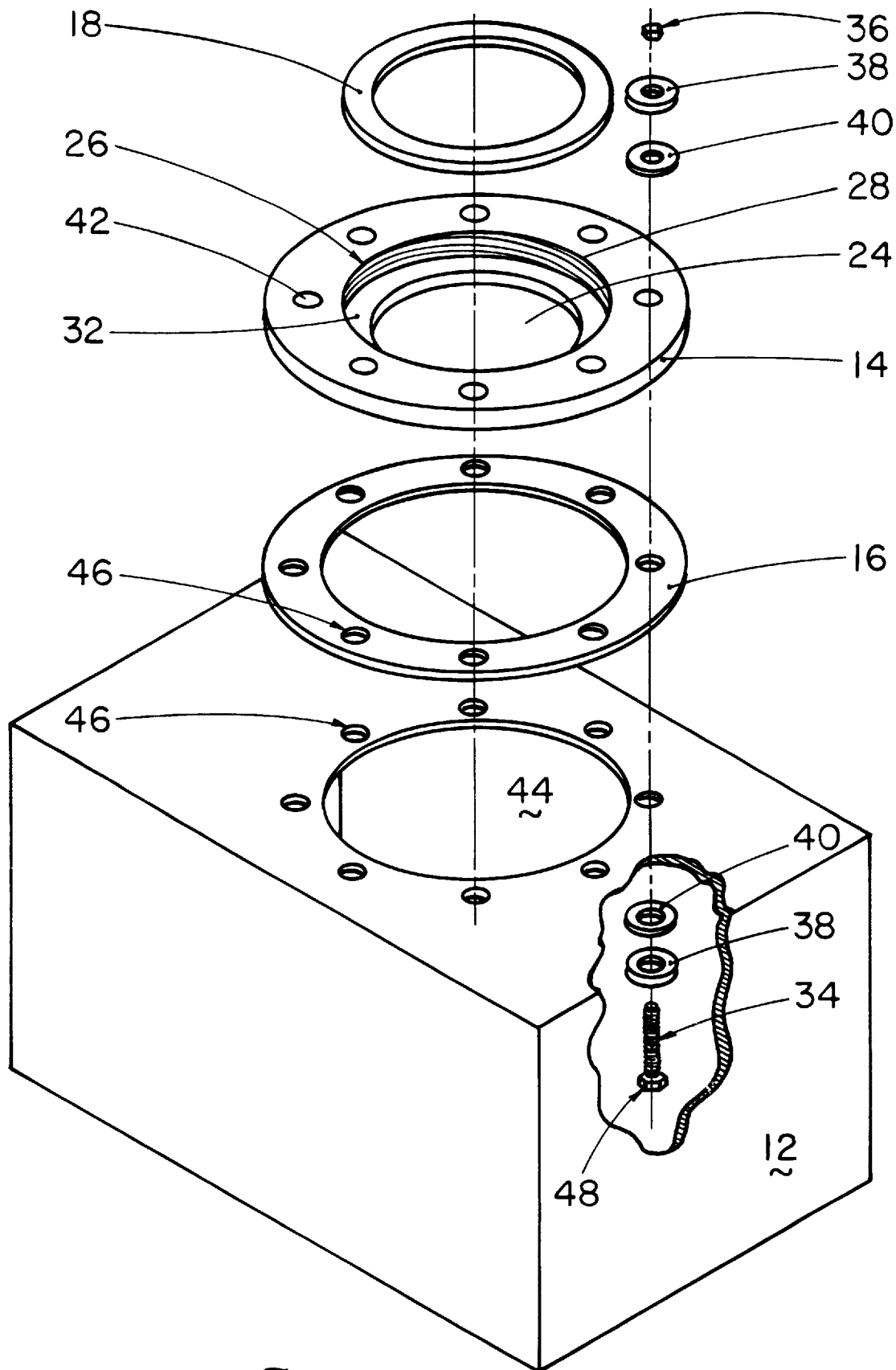
FIG. 2 is an exploded perspective view of present invention shown in FIG. 1.
Figure 3:
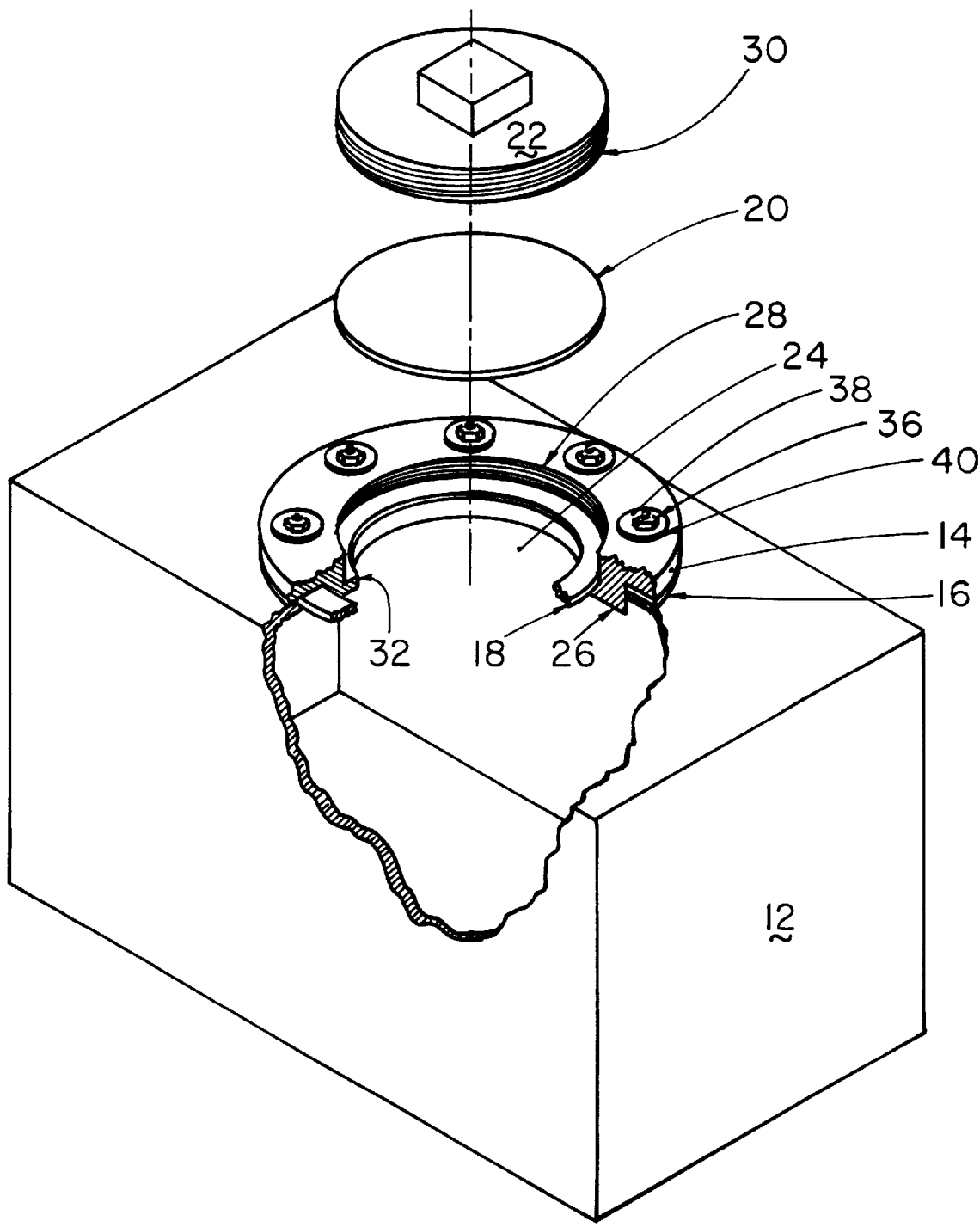
FIG. 3 is a cutaway perspective view of the present invention shown in FIG. 1.

The apparatus is a water tank adapter 10 mounted to a water tank 12 as shown in FIGS. 1–3. The water tank adapter 10 includes an inlet plate 14, outer gasket 16, inner gasket 18, seal plate 20, a threaded plug 22, and mounting hardware. The inlet plate 14 has an opening 24 in its center to allow insertion of cleaning tools and the user's hand. A round side wall 26 extends downward from the opening 24 of the inlet plate 14. The round side wall 26 supports inwardly facing threads 28 that interact with threads 30 on the plug 22. At the bottom of the side wall 26 is a ridge 32 extending inward toward the center of the opening 24 to support the inner gasket 18 and the seal plate 20. The mounting hardware includes bolts 34, nuts 36, washers 38 and washer gaskets 40. The inlet plate 14 is drilled with bolt holes 42 to accept the bolts 34.

The plug 22 is sized to close and seal the opening 24 when threaded into the opening 24 of the inlet plate 14. The outer gasket 16 is a ring gasket that fits tightly around the outside of the side wall 26 and against the bottom of the inlet plate 14. The outer gasket 16 is used to form a seal between the adapter 10 and the water tank 12 to be modified. The inner gasket 18 is a ring gasket placed on top of the ridge 32 and has a ring width of about the width of the ridge 32. The inner gasket 18 provides a seal between the ridge 32 and the plug 22, thereby preventing water from leaking out between the threads 28 and 30. A gasket sealant adhesive can be used to fixed the outer gasket 16 to the inlet plate 14 and the inner gasket 18 to the ridge 32. Both the outer and inner gaskets 16, 18 are usually made from a rubber material.

The seal plate 20 provides an additional seal and is usually made of a hard plastic. This additional seal is due to the seal plate 20 applying a uniform pressure on the inner gasket 18 when the plug 22 forces the seal plate 20 against the inner gasket 18. Therefore, the actual seal is between the seal plate 20 and the inner gasket 18. This additional seal is used to prevent water leakage along the threads 28 and 30 due to gravity, if the adapter 10 is mounted on a side or bottom of the water tank. A very important advantage to using the seal plate 20 is that it protects the inner gasket 18 from damage from the plug 22. The rubber of the inner gasket 18 is usually damaged due to the plug 22 cutting into the rubber during the turning and tightening of the plug 22 against the rubber. This damage can be enhanced if dirt is between the rubber and the plug 22. Therefore, the seal plate 20 takes the abuse of the turning and tightening of the plug 22, while applying a uniform seal across the inner gasket 18.

The method of installation and use of the water tank adapter 10 will now be described. For installation, the first step is to cut a hole 44 in the water tank 12 that will allow the side wall 26 of the inlet plate 14 to be inserted into the water tank 12. The second step is inserting the side wall 26 into the water tank 12 with the outer gasket 16 between the water tank 12 and the inlet plate 14. The third step is to drill bolt holes 46 into the water tank 12 and outer gasket 16 using the bolt holes 42 of the inlet plate 14 as a template. The fourth step is to use the mounting hardware, where the bolts 34 are inserted into bolt holes 42 and 46, where the washers 38 and washer gaskets 40 are between the heads 48 of the bolts 34 and the water tank 12. Nuts 36, washers 38 and gasket washers 40 are used to secure the bolts 34 in the holes 42 and 46, thereby securing the inlet plate 14 to the water tank 12. An intermediate step that can be included is the step of applying an sealing caulk or adhesive between the outer gasket 16 and the water tank 12. This step can be performed before the side wall 26 is inserted or after the bolt holes 46 are drilled, which would require the removal of the side wall 26 and inlet plate 14 before applying the adhesive. The final steps are placing or gluing the inner gasket 18 on the ridge 32; inserting the seal plate 20 in the opening 24 and on the ridge 32 if desired; and screwing the plug 22 into the opening 24. The water tank adapter 10 is now ready for use by removing the plug 22 and the seal plate 20 in order to clean the water tank 12. Once the tank 12 is cleaned the seal plate 20 is inserted into the opening 24 and place onto the inner gasket 18. Then, the plug 22 is threaded into the opening 24 to seal the tank 12.

I claim:

1. A water tank adapter to allow cleaning and service of a water tank, comprising:

an inlet plate having an opening;

an outer gasket to act as a seal between said inlet plate and said water tank;

a plug for closing said opening;

a side wall extending from said inlet plate;

threads along said side wall and threads on said plug which interact to secure said plug to said inlet plate;

a ridge below said threads which extends from said side wall inward toward the opening;

an inner gasket along said ridge; and a solid disk shaped seal plate which is seated between said inner gasket and said plug.

2. The water tank adapter of claim 1, further including bolts to fasten said inlet plate to said water tank.

3. A kit for modifying a water tank to allow cleaning and service of the water tank, comprising:

an inlet plate having an opening;

an outer gasket to act as a seal between said inlet plate and said water tank;

a plug for closing said opening;

a side wall extending from said inlet plate;

threads along said side wall and threads on said plug which interact to secure said plug to said inlet plate;

a ridge below said threads which extends from said side wall inward toward the opening;

an inner gasket along said ridge; and a solid disk shaped seal plate which is seated between said inner gasket and said plug.

4. The kit of claim 3, further including bolts to fasten said inlet plate to said water tank.

5. The method of modifying a water tank for a recreational vehicle, comprising the steps of:

a. Cutting a hole in the water tank;

b. inserting a side wall which extends from an inlet plate into the hole, where a gasket is placed between a surface surrounding the hole and the inlet plate;

c. drilling bolt holes through the gasket and surface of the water tank using bolt holes existing in the inlet plate as a template;

d. bolting the inlet plate to the water tank;

e. adding an inner gasket in an opening of the inlet plate to act as a seal between the inlet plate and a plug;

f. inserting a solid disk shaped seal plate between the inner gasket and the plug to protect the gasket and provide a complete seal of the opening; and g. inserting the plug in the opening of the inlet plate.

6. The method of claim 5, wherein said hole is cut on the side of the tank as opposed to the top or bottom of the tank.

7. The method of claim 5, wherein said hole is cut on the top of the tank.

8. The method of claim 5, wherein said hole is cut on the bottom of the tank.

* * * * *